(12) United States Patent
Hosoda et al.

(10) Patent No.: US 8,501,897 B2
(45) Date of Patent: Aug. 6, 2013

(54) METHOD FOR PRODUCING LIQUID-CRYSTALLINE POLYESTER

(75) Inventors: Tomoya Hosoda, Tsukuba (JP); Eiji Hosoda, Niihama (JP); Masanobu Matsubara, Niihama (JP)

(73) Assignee: Sumitomo Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/556,871

(22) Filed: Jul. 24, 2012

(65) Prior Publication Data

US 2013/0030141 A1    Jan. 31, 2013

(30) Foreign Application Priority Data

Jul. 28, 2011    (JP) .................. 2011-165187

(51) Int. Cl.
*C08G 63/02* (2006.01)
*C08G 64/00* (2006.01)

(52) U.S. Cl.
USPC ............................ 528/182; 528/193; 528/196

(58) Field of Classification Search
USPC .......................................... 528/182, 193, 196
See application file for complete search history.

(56) References Cited

FOREIGN PATENT DOCUMENTS

| JP | 6-192403 | 7/1994 |
| JP | 2002-146003 | 5/2002 |

*Primary Examiner* — Terressa Boykin
(74) *Attorney, Agent, or Firm* — Foley & Lardner LLP

(57) ABSTRACT

The present invention provides a method for producing a liquid-crystalline polyester, which comprises melt-polymerizing monomers in a reactor having a draw outlet to obtain a polymer melt and drawing the polymer melt through the draw outlet, characterized in that the monomers comprise a compound selected from an aromatic hydroxycarboxylic acid and derivatives thereof, a compound selected from an aromatic dicarboxylic acid and derivatives thereof and a compound selected from an aromatic diol, an aromatic hydroxyamine, an aromatic diamine and derivatives thereof; the amount of units derived from a compound containing a 1,2-phenylene and/or a 1,3-phenylene skeleton(s) in the polyester is from 0 to 10 mol %; the melt polymerization is performed in the presence of a heterocyclic compound containing two or more nitrogen atoms; and the polymer melt has a flow initiation temperature of from 220 to 250° C.

4 Claims, No Drawings ined, as a method for producing a liquid-crystalline polyester in a large quantity, a method in which raw monomers are charged in a reactor having a draw outlet and melt-polymerized while raising the temperature, and the polymer melt was drawn through a draw outlet and then the reactor is cooled, followed by repetition of such an operation (see, for example, JP-A-6-192403). There has also been known, as a method for producing a liquid-crystalline polyester having excellent impact resistance with satisfactory productivity, a method in which melt polymerization is performed using a heterocyclic compound containing two or more nitrogen atoms as a catalyst (see, for example, JP-A-2002-146003).

SUMMARY OF THE INVENTION

When a method for performing melt polymerization using a heterocyclic organic base compound containing two or more nitrogen atoms as a catalyst as disclosed in JP-A-2002-146003 is applied to a method for repeating batch-wise melt polymerization using a reactor having a draw outlet as disclosed in JP-A-6-192403 so as to obtain a liquid-crystalline polyester having excellent impact resistance in a large quantity with satisfactory productivity, particularly, in case of obtaining a liquid-crystalline polyester having high rigidity, specifically, a liquid-crystalline polyester including a repeating unit derived from an aromatic hydroxycarboxylic acid, a repeating unit derived from an aromatic dicarboxylic acid and a repeating unit derived from an aromatic dial, an aromatic hydroxyamine or an aromatic diamine, in which a repeating unit containing a 1,2-phenylene skeleton and/or a 1,3-phenylene skeleton in a main chain accounts for 0 to 10 mol % of the whole repeating units, the polymer melt is likely to remain in the reactor in case of drawing since the fluidity of the polymer melt is likely to deteriorate. The polymer melt thus remaining in a large quantity in the reactor is solidified while gradually accumulating at the draw outlet in case of cooling. Furthermore, in case of temperature rise in the melt polymerization of the subsequent batch, it becomes difficult to melt the solidified matter due to an increase in a molecular weight, and thus clogging of the draw outlet is likely to occur. As a result, it becomes difficult to draw the polymer melt of the subsequent batch and to repeat a batch-wise melt polymerization. Thus, an object of the present invention is to provide a method for producing a predetermined liquid-crystalline polyester by performing melt polymerization in a reactor having a draw outlet using a heterocyclic organic base compound containing two or more nitrogen atoms as a catalyst, the method being capable of preventing clogging of the draw outlet due to a solidified matter of a polymer melt.

In order to achieve the above object, the present invention provides a method for producing a liquid-crystalline polyester, the method comprising:

a step of melt-polymerizing raw monomers in a reactor having a draw outlet to obtain a polymer melt; and a step of drawing the polymer melt through the draw outlet, characterized in that:

the raw monomers comprise at least one kind of a compound (1) selected from the group consisting of an aromatic hydroxycarboxylic acid and polymerizable derivatives thereof, at least one kind of a compound (2) selected from the group consisting of an aromatic dicarboxylic acid and polymerizable derivatives thereof and at least one kind of a compound (3) selected from the group consisting of an aromatic diol, an aromatic hydroxyamine, an aromatic diamine and polymerizable derivatives thereof;

the amount of units derived from a compound (A) containing a 1,2-phenylene skeleton and/or a 1,3-phenylene skeleton in a main chain of the resulting polyester is in the range of from 0 to 10 mol % based on the raw monomers;

the melt polymerization is performed in the presence of a heterocyclic compound containing two or more nitrogen atoms; and the polymer melt has a flow initiation temperature of from 220 to 250° C.

According to the present invention, it is possible to prevent clogging of a draw outlet due to a solidified matter of a polymer melt in case of producing a predetermined liquid-crystalline polyester by performing melt polymerization in a reactor having a draw outlet using a heterocyclic organic base compound containing two or more nitrogen atoms as a catalyst.

DETAILED DESCRIPTION OF THE INVENTION

The liquid-crystalline polyester is a polyester which exhibits mesomorphism (namely, liquid crystallinity) in a molten state. In the present invention, at least one kind of a compound (1) selected from the group consisting of an aromatic hydroxycarboxylic acid and polymerizable (polycondensable) derivatives thereof, at least one kind of a compound (2) selected from the group consisting of an aromatic dicarboxylic acid and polymerizable (polycondensable) derivatives thereof, and at least one kind of a compound (3) selected from the group consisting of an aromatic diol, an aromatic hydroxyamine, an aromatic diamine and their polymerizable (polycondensable) derivatives are used as raw monomers for the production of a liquid-crystalline polyester. Thereby, it is possible to obtain a liquid-crystalline polyester including a repeating unit derived from an aromatic hydroxycarboxylic acid, a repeating unit derived from an aromatic dicarboxylic acid, and a repeating unit derived from an aromatic diol, an aromatic hydroxyamine or an aromatic diamine.

Herein, examples of polymerizable derivatives of compounds having a carboxyl group, such as an aromatic hydroxycarboxylic acid and an aromatic dicarboxylic acid include derivatives (esters) in which a carboxyl group is esterified (converted into an alkoxycarbonyl group or an aryloxycarbonyl group); derivatives (acid halides) in which a carboxyl group is halogenated (converted into a haloformyl group); and derivatives (acid anhydrides) in which a carboxyl group is acylated (converted into an acyloxycarbonyl group). Examples of polymerizable derivatives of compounds having a hydroxyl group, such as an aromatic hydroxycarboxylic acid, an aromatic diol and an aromatic hydroxyamine include derivatives (acylates) in which a hydroxyl group is acylated (converted into an acyloxyl group). Examples of polymerizable derivatives of compounds having an amino group, such as an aromatic hydroxyamine and an aromatic diamine include derivatives (acylates) in which an amino group is acylated (converted into an acylamino group).

The compound (1) is preferably an aromatic hydroxycarboxylic acid and a compound in which a hydroxyl group thereof is acylated; the compound (2) is preferably an aromatic dicarboxylic acid; and the compound (3) is is preferably an aromatic diol and a compound in which at least one hydroxyl group thereof is acylated, an aromatic hydroxyamine and a compound in which a hydroxyl group and/or an amino group is/are acylated, and an aromatic diamine and a compound in which at least one amino group thereof is acylated.

The compounds (1) to (3) are respectively compounds represented by the formulas (1) to (3) shown below:

$$R^{11}\text{—}O\text{—}Ar^1\text{—}CO\text{—}R^{12} \quad \text{Formula (1):}$$

wherein $Ar^1$ represents a phenylene group, a naphthylene group or a biphenylylene group, $R^{11}$ represents a hydrogen atom or an acyl group, $R^{12}$ represents a hydroxyl group, an alkoxyl group, an aryloxyl group, an acyloxyl group or a halogen atom, and hydrogen atoms existing in the group represented by $Ar^1$, each independently, may be substituted with a halogen atom, an alkyl group or an aryl group;

$$R^{21}\text{—}CO\text{—}Ar^2\text{—}CO\text{—}R^{22} \quad \text{Formula (2):}$$

wherein $Ar^2$ represents a phenylene group, a naphthylene group, a biphenylylene group, or a group represented by the formula (4) shown below, $R^{21}$ and $R^{22}$ each independently represents a hydroxyl group, an alkoxyl group, an aryloxyl group, an acyloxyl group or a halogen atom, and hydrogen atoms existing in the group represented by $Ar^2$, each independently, may be substituted with a halogen atom, an alkyl group or an aryl group;

$$R^{31}\text{—}X\text{—}Ar^3\text{—}Y\text{—}R^{32} \quad \text{Formula (3):}$$

wherein $Ar^3$ represents a phenylene group, a naphthylene group, a biphenylylene group, or a group represented by the formula (4) shown below, X and Y each independently represents an oxygen atom or an imino group (—NH—), $R^{31}$ and $R^{32}$ each independently represents a hydrogen atom or an acyl group, and hydrogen atoms existing in the group represented by $Ar^3$, each independently, may be substituted with a halogen atom, an alkyl group or an aryl group; and $$\text{—}Ar^{41}\text{—}Z\text{—}Ar^{42}\text{—} \quad \text{Formula (4):}$$

wherein $Ar^{41}$ and $Ar^{42}$ each independently represents a phenylene group or a naphthylene group, and Z represents an oxygen atom, a sulfur atom, a carbonyl group, a sulfonyl group or an alkylidene group.

Examples of the acyloxyl group represented by $R^{11}$, $R^{31}$ or $R^{32}$ include a formyl group, an acetyl group, a propionyl group and a benzoyl group, and the number of carbon atoms may be from 1 to 10. Examples of the alkoxyl group represented by $R^{12}$, $R^{21}$ or $R^{22}$ include a methoxyl group, an ethoxyl group, an n-propyloxyl group, an isopropyloxyl group, an n-butyloxyl group, an isobutyloxyl group, an s-butyloxyl group, a t-butyloxyl group, an n-hexyloxyl group, a 2-ethylhexyloxyl group, an n-octyloxyl group and an n-decyloxyl group, and the number of carbon atoms may be from 1 to 10. Examples of the aryloxyl group represented by $R^{12}$, $R^{21}$ or $R^{22}$ include a phenyloxyl group, an o-tolyloxyl group, a m-tolyloxyl group, a p-tolyloxyl group, a 1-naphthyloxyl group and a 2-naphthyloxyl group, and the number of carbon atoms may be from 6 to 20. Examples of the acyloxyl group represented by $R^{12}$, $R^{21}$ or $R^{22}$ include a formyloxyl group, an acetyloxyl group, a propionyloxyl group and a benzoyloxyl group, and the number of carbon atoms may be from 1 to 10. Examples of the halogen atom represented by $R^{12}$, $R^{21}$ or $R^{22}$ include a fluorine atom, a chlorine atom, a bromine atom and an iodine atom.

Examples of the alkylidene group represented by Z include a methylene group, an ethylidene group, an isopropylidene group, an n-butylidene group and a 2-ethylhexylidene group, and the number of carbon atoms may be from 1 to 10.

Examples of the halogen atom, with which hydrogen atoms existing in the group represented by $Ar^1$, $Ar^2$ or $Ar^3$ may be substituted, include a fluorine atom, a chlorine atom, a bromine atom and an iodine atom. Examples of the alkyl group, with which hydrogen atoms existing in the group represented by $Ar^1$, $Ar^2$ or $Ar^3$ may be substituted, include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group, and the number of carbon atoms may be from 1 to 10. Examples of the aryl group, with which hydrogen atoms existing in the group represented by $Ar^1$, $Ar^2$ or $Ar^3$ may be substituted, include a phenyl group, an o-tolyl group, a m-tolyl group, a p-tolyl group, a 1-naphthyl group and a 2-naphthyl group, and the number of carbon atoms may be from 6 to 20. In case hydrogen atoms existing in the group represented by $Ar^1$, $Ar^2$ or $Ar^3$ are substituted with these groups, the number, each independently, may be 2 or less, and preferably 1 or less, every group represented by $Ar^1$, $Ar^2$ or $Ar^3$.

The compound (1) is preferably a compound in which $Ar^1$ is a p-phenylene group, and $Ar^1$ is a 2,6-naphthylene group in the formula (1). The compound (1) is preferably a compound in which $R^{11}$ and $R^{12}$ are respectively hydroxyl groups, and $R^{11}$ is an acyl group and $R^{12}$ is a hydroxyl group in the formula (1).

The compound (2) is preferably a compound in which $Ar^2$ is a p-phenylene group, $Ar^2$ is a m-phenylene group, and $Ar^2$ is a 2,6-naphthylene group in the formula (2). The compound (2) is preferably a compound in which $R^{21}$ and $R^{22}$ are respectively hydroxyl groups in the formula (2).

The compound (3) is preferably a compound in which $Ar^3$ is a p-phenylene group, and $Ar^3$ is a 4,4'-biphenylylene group in the formula (3). The compound (3) is preferably a compound in which X and Y are respectively oxygen atoms, and X is an oxygen atom and Y is an imino group in the formula (3). The compound (3) is preferably a compound in which $R^{31}$ and $R^{32}$ are respectively hydrogen atoms, $R^{31}$ is a hydrogen atom and $R^{32}$ is an acyl group, $R^{31}$ is an acyl group and $R^{32}$ is a hydrogen atom, and $R^{31}$ and $R^{32}$ are respectively acyl groups in the formula (3).

The use amount of the compound (1) may be 30 mol % or more, preferably from 30 to 80 mol %, more preferably from 40 to 70 mol %, and still more preferably from 45 to 65 mol %, based on the total amount of the whole raw monomers. The use amount of the compound (2) may be 35 mol % or less, preferably from 10 to 35 mol %, more preferably from 15 to 30 mol %, and still more preferably from 17.5 to 27.5 mol %, based on the total amount of the whole raw monomers. The use amount of the compound (3) may be 35 mol % or less, preferably from 10 to 35 mol %, more preferably from 15 to 30 mol %, still more preferably from 17.5 to 27.5 mol %, based on the total amount of the whole raw monomers. As the use amount of the compound (1) increases, melt fluidity, heat resistance and rigidity of the liquid-crystalline polyester are likely to be improved. When the amount is too large, the melting temperature of the liquid-crystalline polyester is likely to increase and the temperature required for molding is likely to increase, and also the solubility of the liquid-crystalline polyester in a solvent is likely to decrease.

A ratio of the use amount of the compound (2) to the use amount of the compound (3) may be from 0.9/1 to 1/0.9, preferably from 0.95/1 to 1/0.95, and more preferably from 0.98/1 to 1/0.98, in terms of [use amount of the compound (2)]/[use amount of the compound (3)] (mol/mol).

Two or more kinds of the compounds (1) to (3), each independently, may be used. Compounds other than the compounds (1) to (3) may be used as raw monomers, and the use amount may be 10 mol % or less, and preferably 5 mol % or less, based on the total amount of the whole raw monomers.

In the present invention, the amount of units derived from a compound (A) containing a 1,2-phenylene skeleton and/or a 1,3-phenylene skeleton in a main chain of the resulting polyester is in the range of from 0 to 10 mol %, preferably in the range of from 0 to 8 mol % and more preferably in the range of from 0 to 6 mol %, based on all the raw monomers used. Thereby, it is possible to obtain a liquid-crystalline polyester which has high rigidity and is excellent in melt fluidity, heat resistance and rigidity, and also the effect of preventing clogging of a draw outlet according to the present invention is exerted particularly is effectively. The proportion of the compound (A) in the all the raw monomers may be 2 mol % or more, and preferably 4 mol % or more, from the viewpoint of lowering the temperature required for molding by lowering the melting temperature of the liquid-crystalline polyester, and increasing the solubility of the liquid-crystalline polyester in a solvent.

In other words, the compound (A) is a compound having a 1,2-phenylene group and/or 1,3-phenylene group which may have a substituent or a fused ring. Examples of the compound (A) as the compound (1) include compounds represented by the formula (1A) shown below, examples of the compound (A) as the compound (2) include compounds represented by the formula (2A) shown below, and examples of the compound (A) as the compound (3) include compounds represented by the formula (3A) shown below:

$R^{11}$—O—$Ar^{1A}$-CO—$R^{12}$   Formula (1A):

wherein $Ar^{1A}$ represents an o-phenylene group, a m-phenylene group, a 1,2-naphthylene group, a 1,3-naphthylene group or a 2,3-naphthylene group, $R^{11}$ represents a hydrogen atom or an acyl group, $R^{12}$ represents a hydroxyl group, an alkoxyl group, an aryloxyl group, an acyloxyl group or a halogen atom, and hydrogen atoms existing in the group represented by $Ar^{1A}$, each independently, may be substituted with a halogen atom, alkyl group or an aryl group;

$R^{21}$—CO—$Ar^{2A}$—CO—$R^{22}$   Formula (2A):

wherein $Ar^{2A}$ represents an o-phenylene group, a m-phenylene group, a 1,2-naphthylene group, a 1,3-naphthylene group or a 2,3-naphthylene group, $R^{21}$ and $R^{22}$ each independently represents a hydroxyl group, an alkoxyl group, an aryloxyl group, an acyloxyl group or a halogen atom, and hydrogen atoms existing in the group represented by $Ar^{2A}$, each independently, may be substituted with a halogen atom, an alkyl group or an aryl group; and

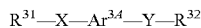

$R^{31}$—X—$Ar^{3A}$—Y—$R^{32}$   Formula (3A):

wherein $Ar^{3A}$ represents an o-phenylene group, a m-phenylene group, a 1,2-naphthylene group, a 1,3-naphthylene group or a 2,3-naphthylene group, X and Y each independently represents an oxygen atom or an imino group, $R^{31}$ and $R^{32}$ each independently represents a hydrogen atom or an acyl group, and hydrogen atoms existing in the group represented by $Ar^{3A}$, each independently, may be substituted with a halogen atom, an alkyl group or an aryl group.

In the present invention, using a heterocyclic compound containing two or more nitrogen atoms as a catalyst, raw monomers are melt-polymerized in the presence of the compound. Thereby, a liquid-crystalline polyester having excellent impact resistance can be produced with satisfactory productivity, and also the effect of preventing clogging of a draw outlet according to the present invention is exerted particularly effectively.

Examples of the heterocyclic compound containing two or more nitrogen atoms include an imidazole compound, a triazole compound, a diazine compound, a triazine compound, a dipyridyl compound, a phenanthroline compound, a diazabicycloalkane compound, a diazabicycloalkene compound, an aminopyridine compound and a purine compound, and two or more kinds of them may be used. Among these compounds, an imidazole compound is preferable.

Examples of the imidazole compound include compounds represented by the formula (I) shown below:

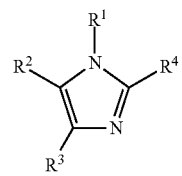

(I)

wherein $R^1$ to $R^4$ each independently represents a hydrogen atom, an alkyl group, an aryl group or an aralkyl group.

Examples of the alkyl group represented by any one of $R^1$ to $R^4$ include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group, and the number of carbon atoms may be from 1 to 10 and preferably from 1 to 4. Examples of the aryl group represented by any one of $R^1$ to $R^4$ include a phenyl group, an o-tolyl group, a m-tolyl group, a p-tolyl group, a 1-naphthyl group and a 2-naphthyl group, and the number of carbon atoms may be from 6 to 20, and preferably from 6 to 10. Examples of the aralkyl group represented by any one of $R^1$ to $R^4$ include a benzyl group, a 1-phenylethyl group, a 2-phenylethyl group, a 1-phenylpropyl group, a 2-n phenylpropyl group and a 3-phenylpropyl group, and the number of carbon atoms may be from 6 to 20, and preferably from 6 to 10.

The imidazole compound is preferably a compound in which $R^1$ is an alkyl group, an aryl group or an aralkyl group and $R^2$ to $R^4$ are respectively hydrogen atoms in the formula (I), and more preferably a compound in which $R^1$ is an alkyl group and $R^2$ to $R^4$ are respectively hydrogen atoms.

Examples of the triazole compound include 1,2,3-triazole, 1,2,4-triazole and benzotriazole. Examples of the diazine compound include pyridazine (1,2-diazine), pyrimidine (1,3-diazine) and pyrazine (1,4-diazine). Examples of the triazine compound include 1,2,3-triazine, 1,2,4-triazine and 1,3,5-triazine. Examples of the dipyridyl compound include 2,2'-dipyridyl and 4,4'-dipyridyl. Examples of the phenanthroline compound include 1,7-phenanthroline (1,5-diazaphenanthrene), 1,10-phenanthroline (1,5-diazaphenanthrene) and 4,7-phenanthroline (1,8-diazaphenanthrene). Examples of the diazabicycloalkane compound include 1,4-diazabicyclo[2.2.2]octane. Examples of the diazabicycloalkene compound include 1,5-m diazabicyclo[4.3.0]non-5-ene and 1,8-diazabicyclo[5.4.0]undec-7-ene. Examples of the aminopyridine compound include N,N-dialkylpyridines such as N,N-dimethylaminopyridine. Examples of the purine compound include 7-alkylpurines such as purine and 7-methylpurine.

The use amount of the heterocyclic compound containing two or more nitrogen atoms may be from 0.002 to 2 mol %, preferably from 0.006 to 1 mol %, and more preferably from 0.02 to 0.6 mol %, based on the total of the whole raw monomers. When the use amount is too small, impact resistance and productivity of the liquid-crystalline polyester are likely to become insufficient. When the use amount is too large, the liquid-crystalline polyester is likely to undergo coloration and it may become difficult to control polymerization.

In the present invention, a melt polymerization is performed using a reactor having a draw outlet and, at the time when a flow initiation temperature of a polymer melt becomes 220 to 250° C., and preferably 230 to 250° C., the polymer melt is drawn through a draw outlet. Thereby, the amount of the polymer melt remaining in the reactor can be decreased, and thus clogging of a draw outlet due to a solidified matter can be prevented. When a flow initiation temperature of the polymer melt to be drawn is too high, the amount of the polymer melt remaining in the reactor is likely to increases and thus clogging of a draw outlet due to a solidified matter is likely to occur. When the a flow initiation temperature is too low, even if a solid phase polymerization is subsequently performed, heat resistance and rigidity of the obtained liquid-crystalline polyester is likely to become insufficient.

The flow initiation temperature of the polymer melt to be drawn can be adjusted by controlling the temperature and time of the melt polymerization according to the composition of raw monomers, kind and amount of the heterocyclic compound containing two or more nitrogen atoms, timing of addition and the like. In case the flow initiation temperature of the polymer melt to be drawn is higher than 250° C., the maximum temperature of melt polymerization may be lowered or the retention time at the maximum temperature may be shorten so as to lower the flow initiation temperature. In case the flow initiation temperature of the polymer melt to be drawn is lower than 220° C., the maximum temperature of melt polymerization may be raised or the retention time at the maximum temperature may be prolonged so as to raise the flow initiation temperature.

The flow initiation temperature is also called a flow temperature and means a temperature at which a melt viscosity becomes 4,800 Pa·s (48,000 poise) when a liquid-crystalline polyester is melted while heating at a heating rate of 4° C./min under a load of 9.8 MPa (100 kg/cm$^2$) and extruded through a nozzle having an inner diameter of 1 mm and a length of 10 mm using a capillary rheometer, and the flow initiation temperature serves as an index indicating a molecular weight of the liquid-crystalline polyester (see "Liquid-crystallineline Polymer Synthesis, Molding, and Application" edited by Naoyuki Koide, page 95, published by CMC Publishing Co., Ltd. on Jun. 5, 1987).

The polymer melt is optionally drawn by increasing the pressure inside the reactor, and the pressure is preferably from 0.005 to 0.2 MPa-G, and more preferably from 0.007 to 0.2 MPa-G, in terms of a gauge pressure.

The polymer melt thus drawn is solidified by cooling and optionally ground and then may be allowed to undergo solid phase polymerization. Thereby, it is possible to obtain a liquid-crystalline polyester which is excellent in heat resistance and rigidity. The solid phase polymerization is preferably performed under an atmosphere of an inert gas such as a nitrogen gas at 180 to 280° C. for 5 minutes to 30 hours. The solid phase polymerization temperature is more preferably from 180 to 240° C., and still more preferably from 200 to 240° C. When the solid phase polymerization temperature is too low, the polymerization is less likely to proceed. When the solid phase polymerization temperature is high, the liquid-crystalline polyester is likely to undergo coloration.

EXAMPLES

[Measurement of Flow Initiation Temperature]

Using a flow tester Model CFT-500 manufactured by Shimadzu Corporation, a flow initiation temperature was measured by the following procedure. About 2 g of a liquid-crystalline polyester was filled in a cylinder with a die including a nozzle having an inner diameter of 1 mm and a length of 10 mm attached thereto, and the liquid-crystalline polyester was melted while raising the temperature at a rate of 4° C./minute under a load of 9.8 MPa (100 kg/cm$^2$) and extruded through the nozzle, and then the temperature at which the liquid-crystalline polyester shows a melt viscosity of 4,800 Pa·s (48,000 poise) was measured.

Example 1

(First Batch Acylation)

In an acylation reactor equipped with a stirrer, a nitrogen gas introducing device, a thermometer and a reflux condenser, 60 mol % of p-hydroxybenzoic acid, 15 mol % of terephthalic acid, 5 mol % of isophthalic acid and 20 mol % of 4,4'-dihydroxybiphenyl were charged, and then acetic anhydride as an acylating agent was charged in the amount of 1.1 mol per mol of the total amount of hydroxyl groups of p-hydroxybenzoic acid and hydroxyl groups of 4,4'-dihydroxybiphenyl. Next, 1-methylimidazol was charged in the amount of 0.019 mol % based on the total amount of p-hydroxybenzoic acid, terephthalic acid, isophthalic acid and 4,4'-dihydroxybiphenyl. After replacing a gas in the acylation reactor by a nitrogen gas, a first batch acylation was performed by raising the temperature from room temperature to 145° C. over 30 minutes while stirring under a nitrogen gas flow and refluxing at 145° C. for 1 hour.

(First Batch Melt Polymerization and Drawing)

To the acylation reaction mixture obtained in the first batch acylation, 1-methylimidazole was further added in the amount of 0.187 mol % based on the total amount of p-hydroxybenzoic acid, terephthalic acid, isophthalic acid and 4,4'-dihydroxybiphenyl used previously, and the mixture was transported to a polymerization reactor having a draw outlet. Then, first batch melt polymerization was performed by raising the temperature from 145° C. to 300° C. over 4 hours and 5 minutes while distilling off the by-produced acetic acid and unreacted acetic anhydride. Immediately, the polymer melt as contents was drawn through the draw outlet of the polymerization reactor. This polymer melt showed a flow initiation temperature of 245° C. The draw outlet of the polymerization reactor was visually observed. As a result, clogging of the draw outlet due to a solidified matter of the polymer melt was not observed.

(Second Batch Acylation)

In the same manner as in the first batch acylation, a second batch acylation was performed during the first batch melt polymerization.

(Second Batch Melt Polymerization and Drawing)

After completion of the first batch drawing, the polymerization reactor was cooled to 150° C. by pouring water on a jacket thereof, a second batch melt polymerization was performed using the second batch acylation reaction mixture in the same manner as in the first batch melt polymerization. Immediately, the polymer melt as contents was drawn through the draw outlet of the polymerization reactor. This polymer melt showed a flow initiation temperature of 248° C. The draw outlet of the polymerization reactor was visually observed. As a result, clogging of the draw outlet due to a solidified matter of the polymer melt was not observed.

(Third Batch Acylation)

In the same manner as in the first batch acylation, a third batch acylation was performed during a second batch melt polymerization.

(Third Batch Melt Polymerization and Drawing)

After completion of the second batch drawing, the polymerization reactor was cooled to 150° C. by pouring water on a jacket thereof, a third batch melt polymerization was performed using the third batch acylation reaction mixture in the same manner as in the first batch melt polymerization. Immediately, the polymer melt as contents was drawn through the draw outlet of the polymerization reactor. This polymer melt showed a flow initiation temperature of 248° C. The draw outlet of the polymerization reactor was visually observed. As a result, clogging of the draw outlet due to a solidified matter of the polymer melt was not observed.

Comparative Example 1

(First Batch Acylation)

In an acylation reactor equipped with a stirrer, a nitrogen gas introducing device, a thermometer and a reflux condenser, 60 mol % of p-hydroxybenzoic acid, 15 mol % of terephthalic acid, 5 mol % of isophthalic acid and 20 mol % of 4,4'-dihydroxybiphenyl were charged, and then acetic anhydride as an acylating agent was charged in the amount of 1.1 mol per mol of the total amount of hydroxyl groups of p-hydroxybenzoic acid and hydroxyl groups of 4,4'-dihydroxybiphenyl. Next, 1-methylimidazol was charged in the amount of 0.019 mol % based on the total amount of p-hydroxybenzoic acid, terephthalic acid, isophthalic acid and 4,4'-dihydroxybiphenyl. After replacing a gas in the acylation reactor by a nitrogen gas, a first batch acylation was performed by raising the temperature from room temperature to 145° C. over 30 minutes while stirring under a nitrogen gas flow and refluxing at 145° C. for 1 hour.

(First Batch Melt Polymerization and Drawing)

To the acylation reaction mixture obtained in the first batch acylation, 1-methylimidazole was further added in the amount of 0.187 mol % based on the total amount of p-hydroxybenzoic acid, terephthalic acid, isophthalic acid and 4,4'-dihydroxybiphenyl used previously, and the mixture was transported to a polymerization reactor having a draw outlet. Then, first batch melt polymerization was performed by raising the temperature from 145° C. to 310° C. over 4 hours and 5 minutes while distilling off the by-produced acetic acid and unreacted acetic anhydride, followed by retention at 310° C. for 30 minutes. Immediately, the polymer melt as contents was drawn through the draw outlet of the polymerization reactor. This polymer melt showed a flow initiation temperature of 258° C. The draw outlet of the polymerization reactor was visually observed. As a result, clogging of the draw outlet due to a solidified matter of the polymer melt was observed.

In the same manner as in the first batch acylation, a second batch acylation was performed during the first batch melt polymerization. However, since clogging of the draw outlet was observed in the first batch drawing, second batch melt polymerization was not performed.

What is claimed is:

1. A method for producing a liquid-crystalline polyester, the method comprising:
    a step of melt-polymerizing raw monomers in a reactor having a draw outlet to obtain a polymer melt; and
    a step of drawing the polymer melt through the draw outlet, characterized in that:
    the raw monomers comprise at least one kind of a compound (1) selected from the group consisting of an aromatic hydroxycarboxylic acid and polymerizable derivatives thereof, at least one kind of a compound (2) selected from the group consisting of an aromatic dicarboxylic acid and polymerizable derivatives thereof and at least one kind of a compound (3) selected from the group consisting of an aromatic diol, an aromatic hydroxyamine, an aromatic diamine and polymerizable derivatives thereof;
    the amount of units derived from a compound (A) containing a 1,2-phenylene skeleton and/or a 1,3-phenylene skeleton in a main chain of the resulting polyester is in the range of from 0 to 10 mol % based on the raw monomers;
    the melt polymerization is performed in the presence of a heterocyclic compound containing two or more nitrogen atoms; and
    the polymer melt has a flow initiation temperature of from 220 to 250° C.

2. The method for producing a liquid-crystalline polyester according to claim 1, wherein the compound (1) is a compound represented by the formula (1) shown below, the compound (2) is a compound represented by the formula (2) shown below, and the compound (3) is a compound represented by the formula (3) shown below:

  Formula (1):

wherein $Ar^1$ represents a phenylene group, a naphthylene group or a biphenylylene group, $R^{11}$ represents a hydrogen atom or an acyl group, $R^{12}$ represents a hydroxyl group, an alkoxyl group, an aryloxyl group, an acyloxyl group or a halogen atom, and hydrogen atoms existing in the group is represented by $Ar^1$, each independently, may be substituted with a halogen atom, an alkyl group or an aryl group;

  Formula (2):

wherein $Ar^2$ represents a phenylene group, a naphthylene group, a biphenylylene group, or a group represented by the formula (4) shown below, $R^{21}$ and $R^{22}$ each independently represents a hydroxyl group, an alkoxyl group, an aryloxyl group, an acyloxyl group or a halogen atom, and hydrogen atoms existing in the group represented by $Ar^2$, each independently, may be substituted with a halogen atom, an alkyl group or an aryl group;

  Formula (3):

wherein $Ar^3$ represents a phenylene group, a naphthylene group, a biphenylylene group, or a group represented by the formula (4) shown below, X and Y each independently represents an oxygen atom or an imino group, $R^{31}$ and $R^{32}$ each independently represents a hydrogen atom or an acyl group, and hydrogen atoms existing in the group represented by $Ar^3$, each independently, may be substituted with a halogen atom, an alkyl group or an aryl group; and

  Formula (4):

wherein $Ar^{41}$ and $Ar^{42}$ each independently represents a phenylene group or a naphthylene group, and Z represents an oxygen atom, a sulfur atom, a carbonyl group, a sulfonyl group or an alkylidene group.

3. The method for producing a liquid-crystalline polyester according to claim 1, wherein the compound (A) is a compound represented by the formula (1A), (2A) or (3A) shown below:

  Formula (1A):

wherein $Ar^{1A}$ represents an o-phenylene group, a m-phenylene group, a 1,2-naphthylene group, a 1,3-naphthylene group or a 2,3-naphthylene group, $R^{11}$ represents a hydrogen atom or an acyl group, $R^{12}$ represents a hydroxyl group, an alkoxyl group, an aryloxyl group, an acyloxyl group or a halogen atom, and hydrogen atoms existing in the group represented by $Ar^{1A}$, each independently, may be substituted with a halogen atom, alkyl group or an aryl group;

$$R^{21}\text{—CO—}Ar^{2A}\text{—CO—}R^{22} \qquad \text{Formula (2A):}$$

wherein $Ar^{2A}$ represents an o-phenylene group, a m-phenylene group, a 1,2-naphthylene group, a 1,3-naphthylene group or a 2,3-naphthylene group, $R^{21}$ and $R^{22}$ each independently represents a hydroxyl group, an alkoxyl group, an aryloxyl group, an acyloxyl group or a halogen atom, and hydrogen atoms existing in the group represented by $Ar^{2A}$, each independently, may be substituted with a halogen atom, an alkyl group or an aryl group; and $$R^{31}\text{—X—}Ar^{3A}\text{—Y—}R^{32} \qquad \text{Formula (3A):}$$

wherein $Ar^{3A}$ represents an o-phenylene group, a m-phenylene group, a 1,2-naphthylene group, a 1,3-naphthylene group or a 2,3-naphthylene group, X and Y each independently represents an oxygen atom or an imino group, $R^{31}$ and $R^{32}$ each independently represents a hydrogen atom or an acyl group, and hydrogen atoms existing in the group represented by $Ar^{3A}$, each independently, may be substituted with a halogen atom, an alkyl group or an aryl group.

4. The method for producing a liquid-crystalline polyester according to any one of claim 1, wherein the heterocyclic compound is a compound represented by the formula (I) shown below:

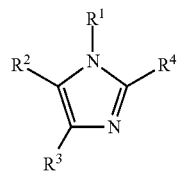

(I)

wherein $R^1$ to $R^4$ each independently represents a hydrogen atom, an alkyl group, an aryl group or an aralkyl group.

* * * * *